United States Patent
Ott et al.

(10) Patent No.: US 10,788,628 B2
(45) Date of Patent: Sep. 29, 2020

(54) MULTI-FIBER FIBER OPTIC CONNECTOR

(71) Applicant: COMMSCOPE TECHNOLOGIES LLC, Hickory, NC (US)

(72) Inventors: Michael James Ott, Hudson, WI (US); John D. Schmidt, Minneapolis, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 16/498,862

(22) PCT Filed: Mar. 28, 2018

(86) PCT No.: PCT/US2018/024843
§ 371 (c)(1),
(2) Date: Sep. 27, 2019

(87) PCT Pub. No.: WO2018/183496
PCT Pub. Date: Oct. 4, 2018

(65) Prior Publication Data
US 2020/0057208 A1    Feb. 20, 2020

Related U.S. Application Data

(60) Provisional application No. 62/478,323, filed on Mar. 29, 2017.

(51) Int. Cl.
*G02B 6/38* (2006.01)
(52) U.S. Cl.
CPC ......... *G02B 6/3885* (2013.01); *G02B 6/3829* (2013.01); *G02B 6/3882* (2013.01); *G02B 6/3825* (2013.01)

(58) Field of Classification Search
None
See application file for complete search history.

(56) References Cited

U.S. PATENT DOCUMENTS

| | | | |
|---|---|---|---|
| 5,654,878 A | 8/1997 | Sasao et al. | |
| 5,980,117 A * | 11/1999 | Feuer | G02B 6/3851 385/59 |
| 6,758,600 B2 | 7/2004 | Del Grosso et al. | |

(Continued)

FOREIGN PATENT DOCUMENTS

| | | |
|---|---|---|
| WO | 2012/112344 A1 | 8/2012 |
| WO | 2013/117598 A2 | 8/2013 |

(Continued)

OTHER PUBLICATIONS

International Search Report and Written Opinion of the International Searching Authority for International Patent Application No. PCT/US2018/024843 dated Jun. 26, 2018, 10 pages.

*Primary Examiner* — Chad H Smith
(74) *Attorney, Agent, or Firm* — Merchant & Gould P.C.

(57) ABSTRACT

A fiber optic connector includes a connector body housing a plurality of optical fibers. Each of the plurality of optical fibers includes a bare end having an angled face. Half of the plurality of optical fibers has an angled face that is at a first angle and the other half of the plurality of optical fibers has an angled face that is at a second angle that is different from the first angle. The fiber optic connector can comprise a ferrule-less or ferruled fiber optic connector.

24 Claims, 10 Drawing Sheets

(56) References Cited

U.S. PATENT DOCUMENTS

| | | |
|---|---|---|
| 6,869,227 B2 | 3/2005 | Del Grosso et al. |
| 7,184,635 B2 | 2/2007 | Livingston |
| 7,689,079 B2 | 3/2010 | Burnham et al. |
| 8,870,466 B2 | 10/2014 | Lu |
| 2002/0114589 A1 | 8/2002 | Igl et al. |
| 2003/0179993 A1* | 9/2003 | Shigenaga ............ G02B 6/3885 385/33 |
| 2004/0057671 A1* | 3/2004 | Kang .................... G02B 6/3885 385/71 |
| 2008/0124027 A1 | 5/2008 | Fenwick et al. |
| 2014/0072265 A1 | 3/2014 | Ott |
| 2019/0162910 A1 | 5/2019 | Gurreri |

FOREIGN PATENT DOCUMENTS

| | | |
|---|---|---|
| WO | 2016/043922 A1 | 3/2016 |
| WO | 2016/100384 A1 | 6/2016 |
| WO | 2017/013930 A1 | 1/2017 |
| WO | 2017/081306 A1 | 5/2017 |
| WO | 2017/223072 A1 | 12/2017 |
| WO | 2018/017883 A1 | 1/2018 |

* cited by examiner

Front

Back

Front

Back

MULTI-FIBER FIBER OPTIC CONNECTOR

CROSS-REFERENCE TO RELATED APPLICATION

This application is a National Stage Application of PCT/US2018/024843, filed on Mar. 28, 2018, which claims the benefit of U.S. Patent Application Ser. No. 62/478,323, filed on Mar. 29, 2017, the disclosures of which are incorporated herein by reference in their entireties. To the extent appropriate, a claim of priority is made to each of the above disclosed applications.

TECHNICAL FIELD

The present disclosure is directed to fiber optics and, more specifically, to the connectors used with multi-fiber fiber optic cables.

BACKGROUND OF THE DISCLOSURE

The demand for higher and higher data speeds continues to grow. To accommodate that demand, data centers utilize multi-fiber fiber optic cables to connect servers, switches and storage. Multi-fiber fiber optic cables enable the use of a great number of fibers in a small space. However, inherent in the use of multi-fiber fiber optic cables is the need to maintain polarity in point-to-point connections. The maintenance of polarity essentially comprises maintaining proper continuity between transmitters and receivers. To achieve the maintenance of polarity, connectors such as multi-fiber push-on/pull-off (MPO) connectors have been developed to accommodate the various data transmission protocols. The design of the MPO connector demands that there be four types of MPO connectors: (1) male/pin connectors that are keyup; (2) male/pin connectors that are keydown; (3) female/no pin connectors that are keyup; (4) female/no pin connectors that are keydown. The four types of MPO connector work in conjunction with two mating adapters: (1) a type A adapter (keyup to keydown); and (2) a type B adapter (keyup to keyup). Accordingly, a user of MPO connectors must ensure that the appropriate one of four connectors and the appropriate one of two mating adapters are selected in accordance with the cable being used, the data transmission protocol being used, and the maintenance of polarity; a complicated proposition for an unfamiliar user.

SUMMARY

The present disclosure is directed to a multi-fiber fiber optic cable connector wherein half of the optical fibers include bare fiber tips angled in a first direction and the other half of the optical fibers include bare fiber tips angled in a second direction opposite to the first direction. The connectors are configured to interface with one another with or without keying, and with or without a mating adapter. A single configuration of the multi-fiber fiber optic cable connector can be used to achieve a plurality of coupling configurations. The multi-fiber fiber optic cable connector may be of a ferrule-less or ferruled configuration.

One aspect of the present disclosure is directed to a fiber optic connector. The fiber optic connector includes a connector body housing a plurality of optical fibers. Each of the plurality of optical fibers includes a bare end having an angled face. Half of the plurality of optical fibers has an angled face that is at a first angle and the other half of the plurality of optical fibers has an angled face that is at a second angle that is different from the first angle. The fiber optic connector can comprise a ferrule-less or ferruled fiber optic connector.

Another aspect of the present disclosure is directed to a system comprising a multi-fiber fiber optic cable and a connector. The multi-fiber fiber optic cable includes a plurality of optical fibers. Each of the plurality of optical fibers includes a bar end having an angled face. A first half of the plurality of optical fiber has an angled face that is at a first angle and a second half of the plurality of optical fibers has an angled face that is at a second angle that is complementary to the first angle. The connector includes a plurality of channels. Each one of the plurality of optical fibers is positioned within a corresponding channel of the connector to place the angled face of the bare end of the optical fiber at a mating end of the channel.

Another aspect of the present disclosure is directed to a system comprising a multi-fiber fiber optic cable, a first connector and a second connector. The multi-fiber fiber optic cable includes a plurality of optical fibers with each including a first end and a second end. Each of the first and second ends of the optical fibers has a bare end that includes an angled face. A first half of the first ends and a first half of the second ends of the plurality of optical fibers have an angled face that is at a first angle. A second half of the first ends and a second half of the second ends of the plurality of optical fibers have an angled face that is at a second angle that is complementary to the first angle. Each of the first and second connectors includes a plurality of channels. Each one of the plurality of optical fibers is positioned within a corresponding channel of the first connector to place the first end of the optical fiber at a mating end of the channel of the first connector. Each of the of plurality of optical fibers is positioned with a corresponding channel of the second connector to place the second end of the optical fiber at a mating end of the channel of the second connector.

Still another aspect of the present disclosure is directed to a method of connectorizing a patch cable that has a plurality of optical fibers with each optical fiber having a bare end. The method includes: cleaving the bare end of a first half of the plurality of optical fiber to an angled face having a first angle; cleaving the bare end of a second half of the plurality of optical fibers to an angled face having a second angle that is complementary to the first angle; and inserting each one of the plurality of cleaved optical fibers into a corresponding channel of a connector body until the angled face of the cleaved optical fiber is at a mating end of the channel.

The above summary is not intended to describe each embodiment or every implementation. A more complete understanding will become apparent and appreciated by referring to the following detailed description and claims in conjunction with the accompanying drawings.

DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
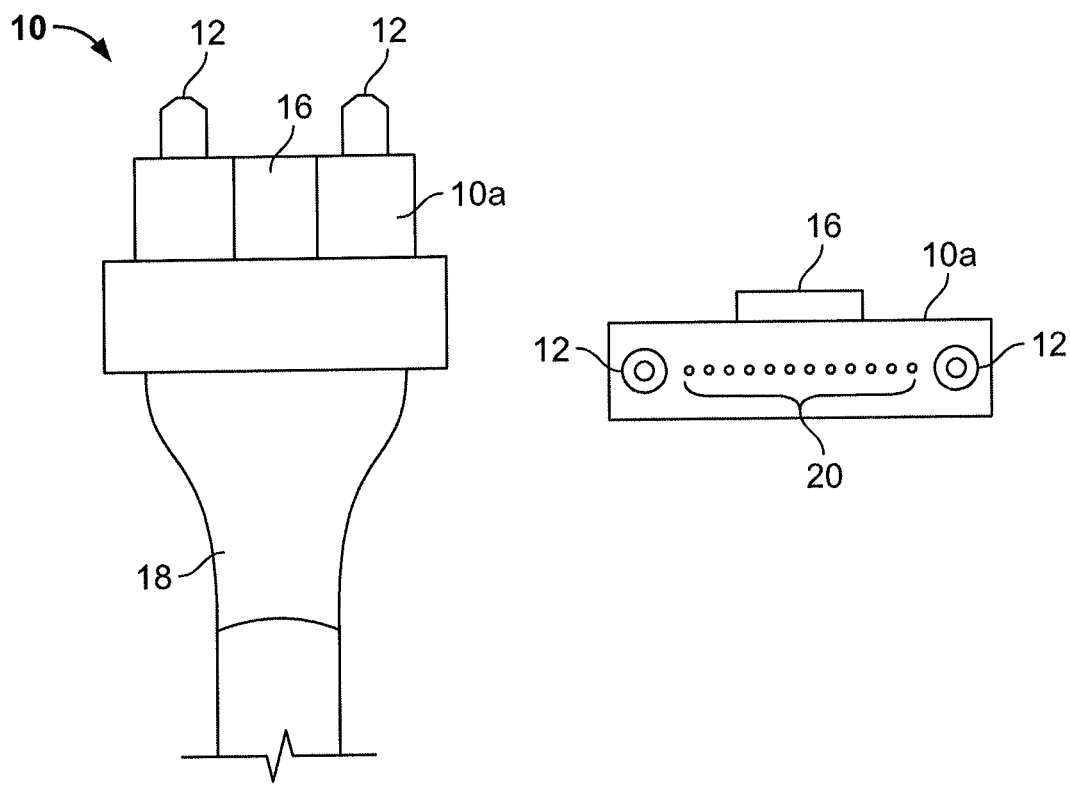
FIGS. 1A-1D include a top and end view of each of the four types of MPO connectors, with FIG. 1A illustrating a male/pin key up MPO connector, FIG. 1B illustrating a male/pin key down MPO connector, FIG. 1C illustrating a female/no pin key up MPO connector and FIG. 1D illustrating a female/no pin key down MPO connector.

The present disclosure is directed to multi-fiber fiber optic connectors having a single configuration to achieve both top-up to top-down (type A) and top-up to top-up (type B) couplings of the connectors as opposed to the four configurations of connectors required in MPO connectors. The multi-fiber fiber optic connector provides coupling of optical fibers through use of optical fibers having complementary angled bare ends, wherein a first half of the optical fibers within the multi-fiber fiber optic connector includes bare ends that are angled at a first angle and a second half of the optical fibers within the multi-fiber fiber optic connector includes bare ends that are angled at a second angle with the second angle being complementary to the first angle.

FIGS. 1A-1D illustrate the four types of MPO connectors 10 having either guide pins 12 or channels 14 (to receive the guide pins 12), and a key portion 16. Each MPO connector 10 operates as a ferrule for a multi-fiber fiber optic cable 18 having a plurality of optical fibers 20. The MPO connectors 10 of FIGS. 1A-1D each include a single row of twelve optical fibers 20, however, other configurations with additional rows and numbers of fibers 20 are possible.

Figure 1B:
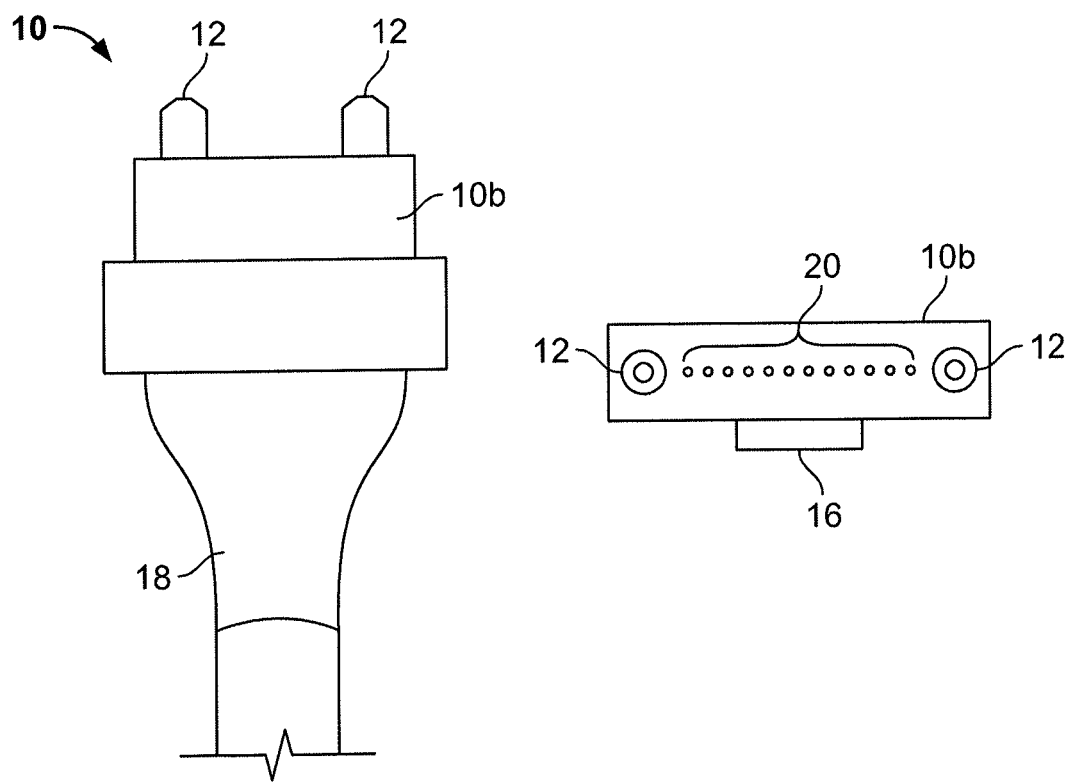
Figure 1C:
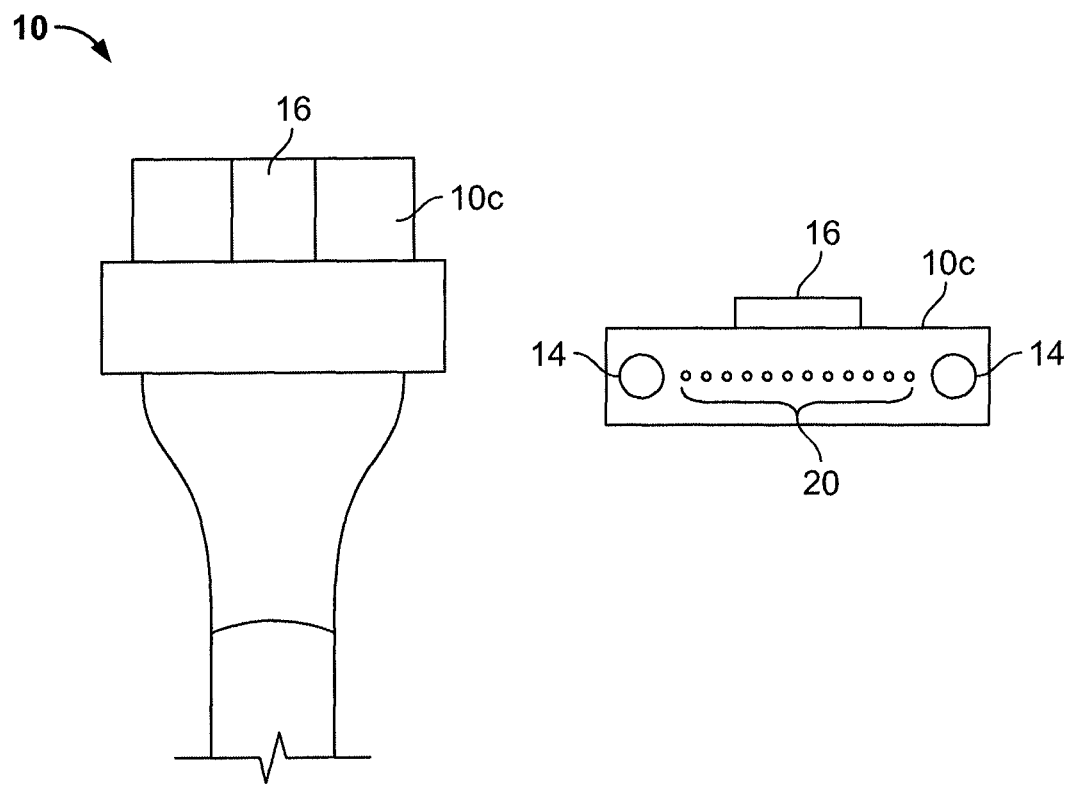
Figure 1D:
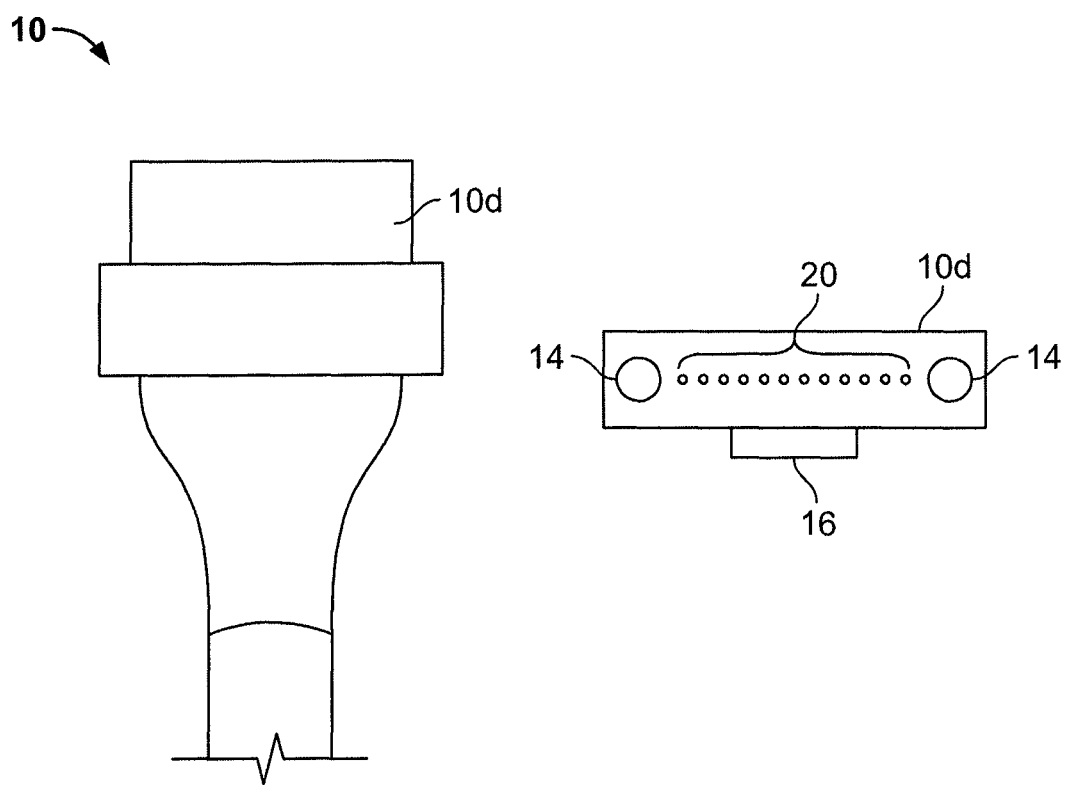

FIG. 1A illustrates a male/pin keyup MPO connector 10a, FIG. 1B illustrates a male/pin keydown MPO connector 10b, FIG. 1C illustrates a female/no pin keyup MPO connector 10c and FIG. 1D illustrating a female/no pin keydown MPO connector 10d. The MPO connectors 10 can be provided at the ends of multi-fiber fiber optic cables, such as patch cables 18, to be coupled to various devices or to another patch cable. When coupling two MPO connectors one must be a male connector with the other a female connector. Further, each of the male and female MPO connectors must be keyed appropriately to ensure maintenance of polarity between transmitters and receivers according to a selected communication protocol.

Figure 2A:
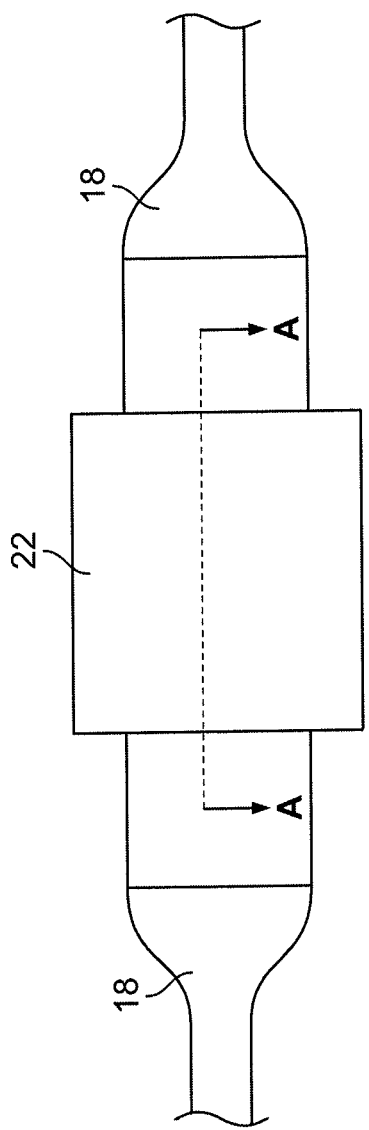
FIG. 2A is a top view of an MPO mating adapter coupled intermediate two MPO connectors.
Figure 2B:
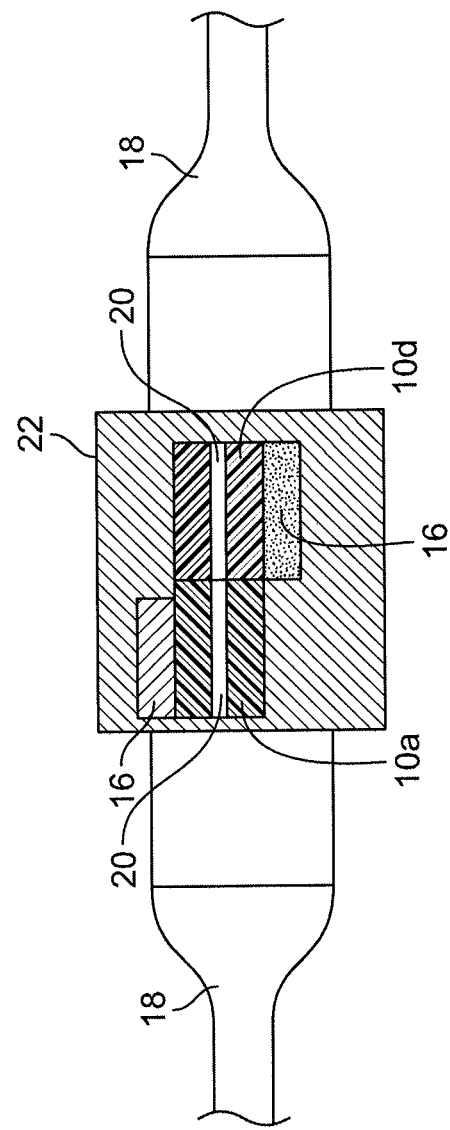
FIG. 2B is a cross-sectional view of the adapter of FIG. 2A taken along line A-A illustrating the coupling of a male/pin keyup MPO connector to a female/no pin keydown MPO connector.
Figure 3:
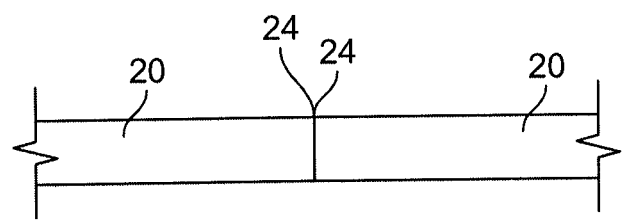
FIG. 3 illustrates the interface between bare fiber tips of two coupled MPO connectors.

Referring to FIGS. 2A-2B, a mating adapter 22, configured to receive the selected key orientation of the MPO connectors (e.g., type A adapter providing key up to key down coupling, or type B adapter providing key up to key up coupling) operates as a connection point for coupling male and female MPO connectors 10. The mating adapter 22 essentially provides an empty channel for insertion of the MPO connectors 10 such that the guide pins 12 of the male MPO connector are received with the channels 14 of the female MPO connector 10 and the fibers 20 of each of the MPO connectors 10 are aligned with one another. More specifically, the bare ends 24 of each of the fibers 20 in the MPO connectors 10 are flat and abut one another when the MPO connectors 10 are coupled. FIG. 3 illustrates the flat face interface of the bare ends 24 of a pair of optical fibers 20 when two MPO connectors 10 are coupled.

Figure 4:
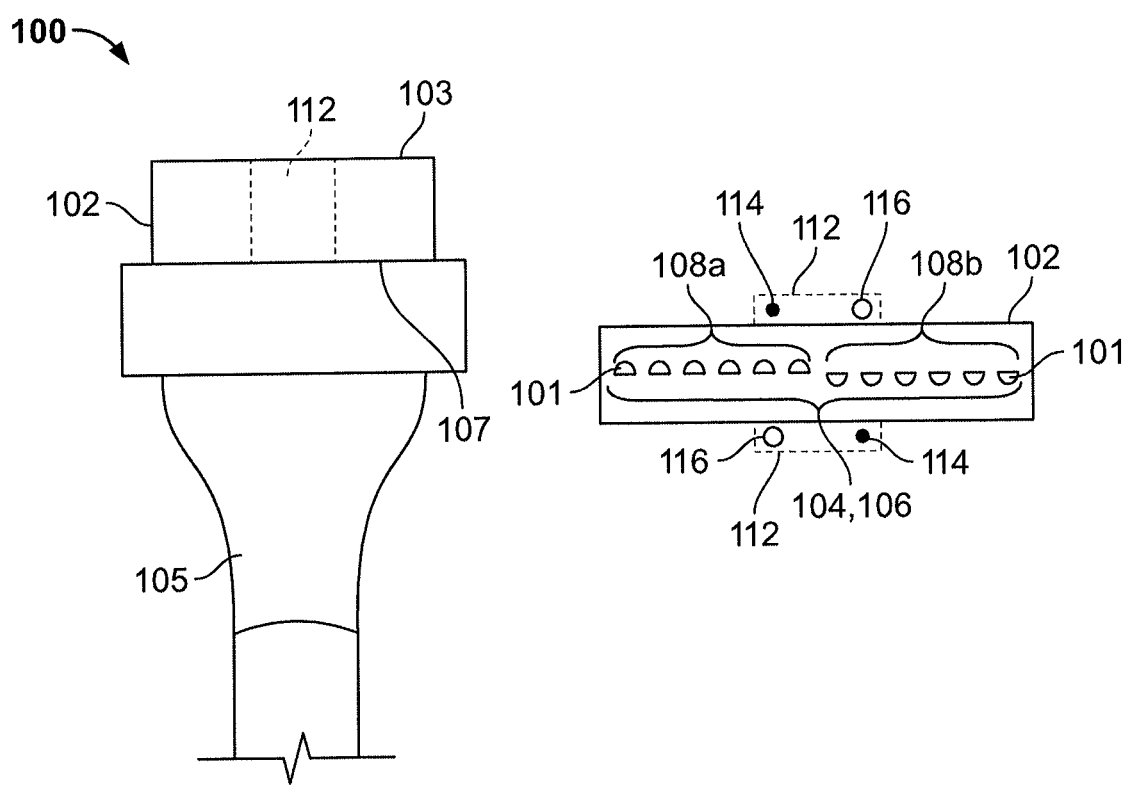
FIG. 4 is a top and end view of multi-fiber fiber optic connector of the present disclosure.

Referring to FIG. 4, the present disclosure is directed to a multi-fiber fiber optic connector 100 that can be used to connectorize one or both ends of a multi-fiber fiber optic cable 105, e.g., a patch cable. A body portion 102 of the multi-fiber fiber optic connector includes a plurality of channels 101 having a mating end 103 and a non-mating end 107. Each of the channels 101 of the body portion 102 operates as a ferrule for one of a plurality of optical fibers 104 of the multi-fiber cable 105. Each of the optical fibers 104 includes a bare end 106 that has been appropriately cleaved to present an angled face 108 that is positioned at the mating end 103 of its respective channel 101. In certain examples, the bare end 106 of the optical fiber 104 extends beyond the mating end 103 of its respective channel 101. In certain examples, the bare end 106 of the optical fiber 104 does not extend beyond mating end 103 of its respective channel 101.

Figure 5A:
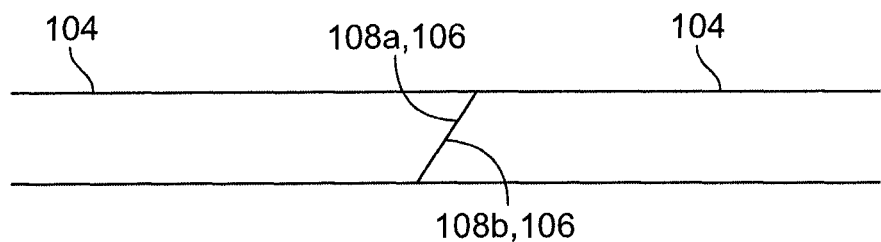
FIGS. 5A and 5B illustrate a first and second example, respectively, of the interface between bare angled fiber tips of two coupled multi-fiber fiber optic connectors.
Figure 5B:
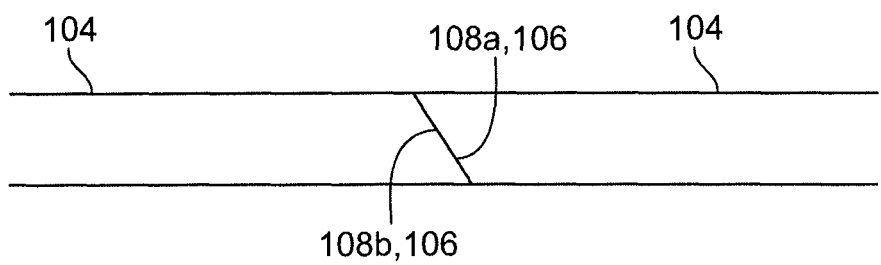

In certain examples of the multi-fiber fiber optic connector 100, the bare ends 106 of half of the plurality of optical fibers 104 are cleaved to present an angled face 108a having a first angle A of approximately 45 degrees while the bare ends 106 of the other half of the plurality of optical fibers 104 are cleaved to present an angled face 108b having a second angle B, wherein the second angle B is a complementary 45 degree angle to angle A (e.g., ∠A+∠B=90 deg.). In certain examples, other complementary angles for angles A and B are used, e.g., ∠A=30 deg. and ∠B=60 deg., ∠A=75 deg. and ∠B=15 deg., etc. FIGS. 5A and 5B illustrate examples of the angled interface of the angled bare ends 108a, 108b of a pair of optical fibers 104 when two of the multi-fiber fiber optic connectors 100 are coupled. It should be noted that the bare ends 106 of the plurality of optical fiber 104 can be cleaved and/or otherwise finished, e.g. laser finished, prior to or after being connectorized with the multi-fiber fiber optic connector 100.

Figure 6:
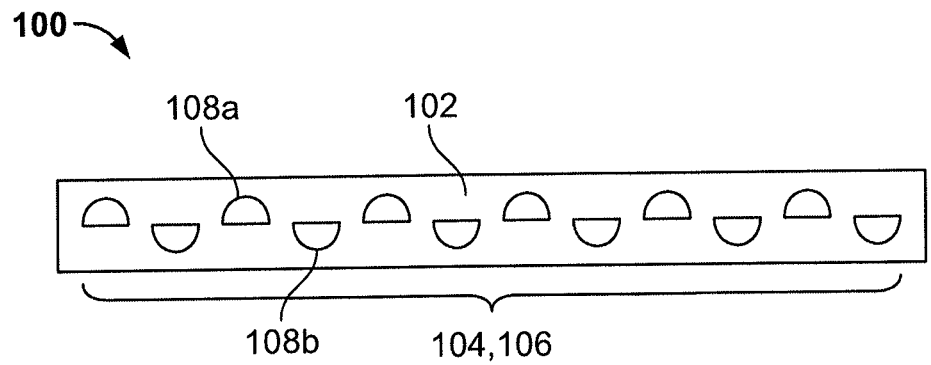
FIG. 6 is an end view of an example embodiment of the multi-fiber fiber optic connector.
Figure 7:
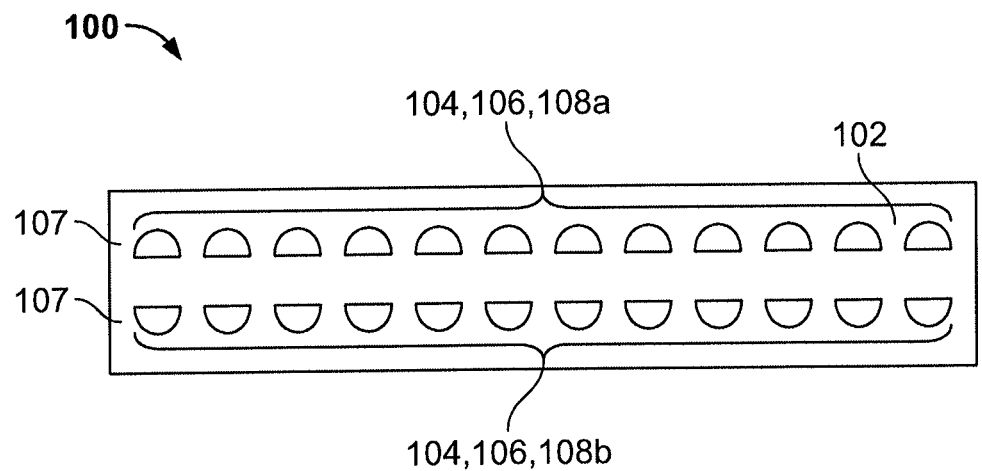
FIG. 7 is an end view of another example embodiment of the multi-fiber fiber optic connector.

In certain examples, referring to FIG. 4, the multi-fiber fiber optic connector 100 presents a sequence of optical fibers 104 wherein the first half of the optical fibers 104 in the sequence have bare ends 106 with an angled face 108a of angle A while the remaining half of the sequence of optical fibers 104 have bare ends 106 with an angled face 108b of angle B. In certain examples of the multi-fiber fiber optic connector 100, referring to FIG. 6, the multi-fiber fiber optic connector 100 presents an alternating sequence of optical fibers 104 wherein the optical fibers 104 having a bare end 106 with an angled face 108a of angle A alternate with the optical fibers 104 having a bare end 106 with an angled face 108b of angle B. In certain examples, two angle A optical fibers 104 alternate with two angle B optical fibers 104, three angle A optical fibers 104 alternate with three angle B optical fibers 104, four angle A optical fibers 104 alternate with four angle B optical fibers 104, etc. In certain examples, the multi-fiber fiber optic connector 100 includes a plurality of rows 109 of optical fibers 104 wherein each row 109 is configured as described above, e.g. a half and half sequence of fibers or alternating sequence of fibers. In certain examples, the multi-fiber fiber optic connector 100 includes a plurality of rows 109 of optical fibers 104 wherein a first row includes only angle A optical fibers and a second row includes only angle B optical fibers, see FIG. 9.

In certain examples, the number of optical fibers 104 connectorized by a single multi-fiber fiber optic connector 100 comprises at least two optical fibers 104. In certain examples, the number of optical fibers connectorized by a single multi-fiber fiber optic connector 100 comprises greater than two optical fibers including at least 12 optical fibers 104, at least 24 optical fibers 104, at least 36 optical fibers 104, at least 48 optical fibers 104, at least 60 optical fibers 104 or at least 72 optical fibers.

Figure 8:
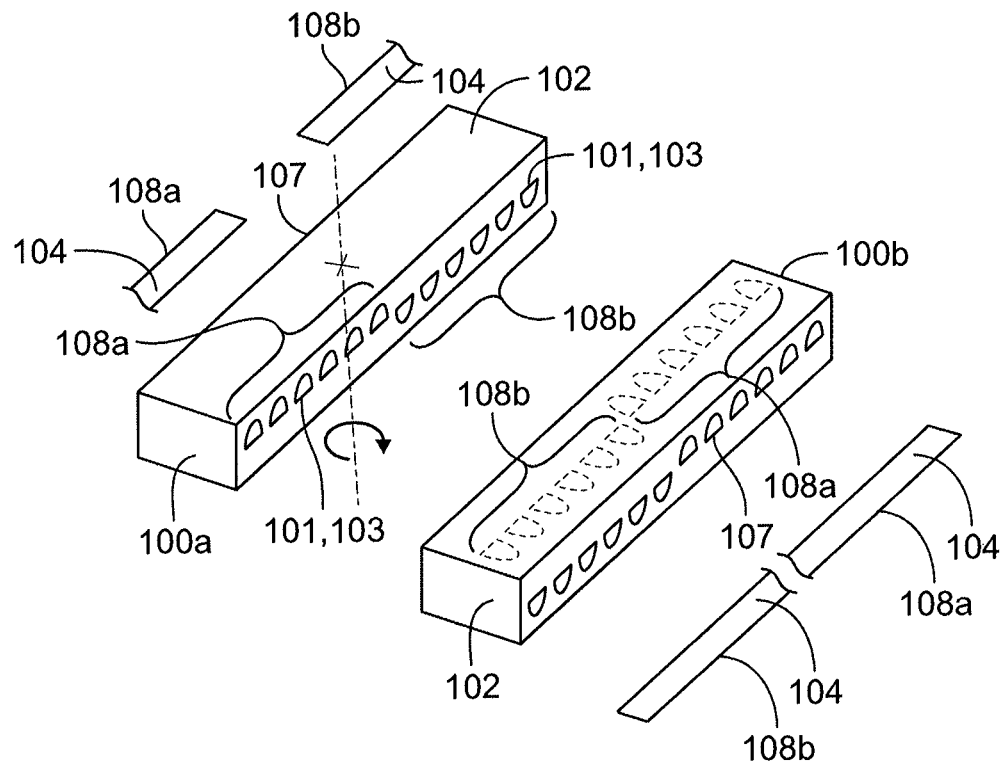
FIG. 8 illustrates the coupling positions of two top-up multi-fiber fiber optic connectors.
Figure 9A:
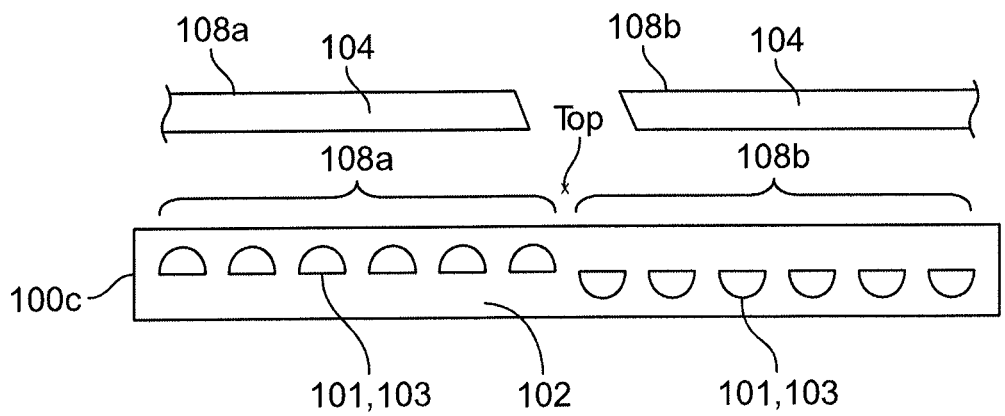
FIGS. 9A-9D illustrate the process of achieving top-up to top-down coupling positions of two multi-fiber fiber optic connectors.
Figure 9B:
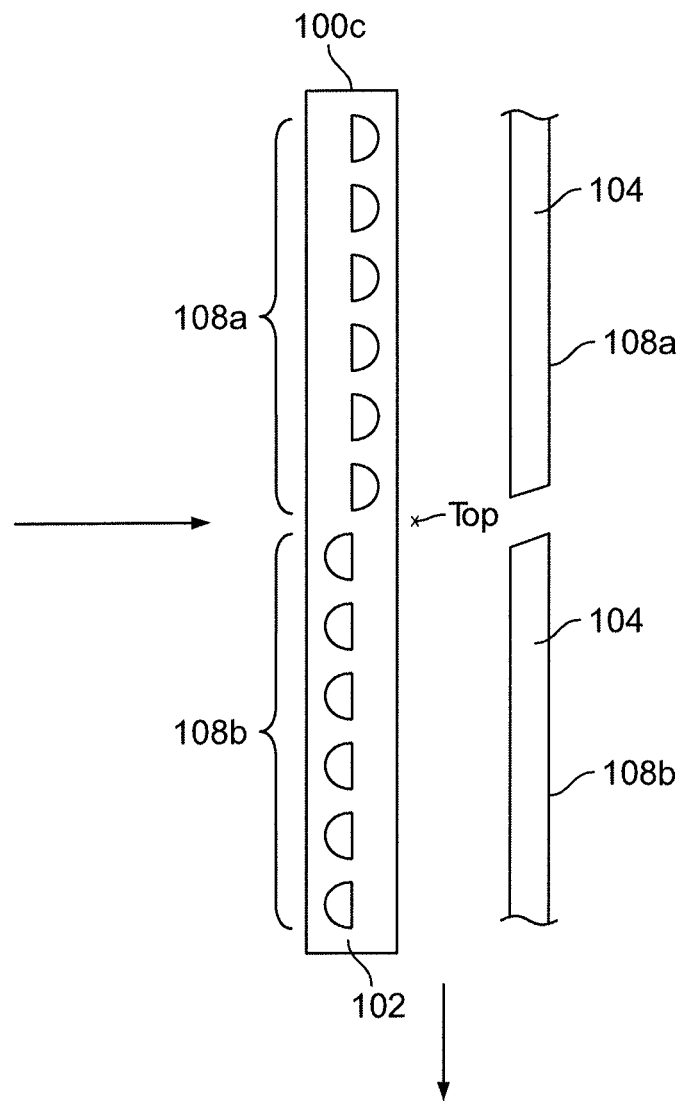
Figure 9C:
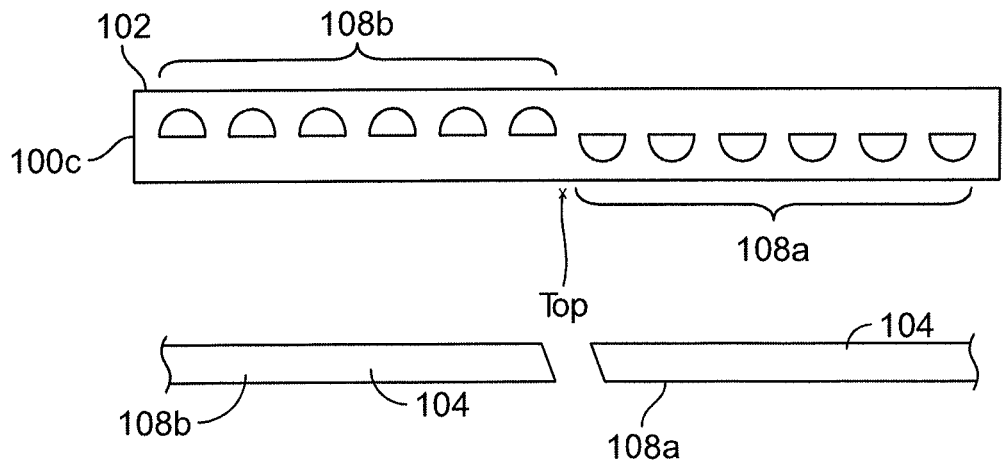
Figure 9D:
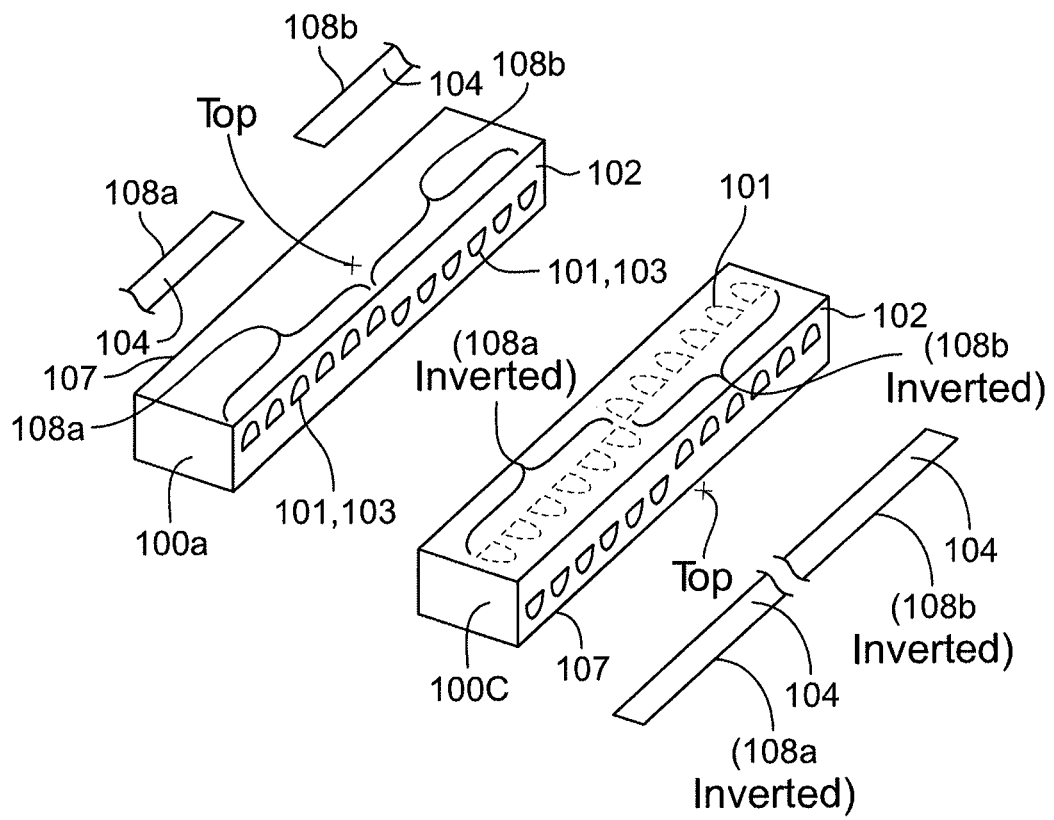

A single configuration of the multi-fiber fiber optic connector 100 enables coupling of two multi-fiber optic connectors in at least two different manners. First, referring to FIG. 8, the body 102 of a first multi-fiber fiber optic connector 100a is positioned with a top of the connector 100a marked with an X (top-up). The multi-fiber fiber optic connector 100a includes a first six optical fibers 104 having an angled face 108a with angle A and a second six optical fibers 104 having a complementary angled face 108b of angle B. A second multi-fiber fiber connector 100b is rotated 180 degrees about a vertical axis through X to face connector 100a and to present a first six optical fibers 104 having an angled face 108b with angle B to interface with the angled faces 108a of multi-fiber fiber optic connector 100a and to present a second six optical fibers 104 having an angled face 108a with angle A to interface with the angled faces 108b of multi-fiber fiber optic connector 100a (top-up).

The second manner of coupling two multi-fiber fiber optic connectors 100, wherein the multi-fiber fiber optic connectors 100 are of a single, identical configuration, is illustrated in FIGS. 9A-9D. As shown, the same body 102 of the first multi-fiber fiber connector 100a includes a first six optical fibers 104 having an angled face 108a with angle A and a second six optical fibers 104 having a complementary angled face 108b of angle B; the top of the body 102 is marked with an X (top-up). A second multi-fiber fiber optic connector 100c is inverted such that original top position of X is at the bottom of body 102 (top-down) (see FIG. 9C). The inverted multi-fiber fiber optic connector 100c is rotated to face the multi-fiber fiber optic connector 100a (see FIG. 9D) and to present a first six optical fibers 104 having an inverted angled face 108a (where inverted $\angle A=\angle B$) to interface with the angled faces 108a of the multi-fiber fiber optic connector 100a and to present a second six optical fibers 104 having an inverted angled face 108b (where inverted $\angle B=\angle A$) to interface with the angled faces 108b of multi-fiber fiber optic connector 100a.

In certain examples, the two identically configured multi-fiber fiber optic connectors 100 are capable of being coupled without keys, e.g. upkeys or downkeys, and/or without guide pins and guide channels, and/or without a mating adapter. Rather, the complementary angled faces 108a, 108b of the fibers 104 help to draw the first and second connectors (100a/100b or 100a/100c) together in either a normal (top-up to top-up, see FIG. 8) or inverted (top-up to top-down, see FIG. 9D) orientation, respectively, without the keys, pins and channels required by an MPO connector. As such, a single configuration of the multi-fiber fiber connector 100 can be used to replace the four configurations required by the MPO connectors. In certain embodiments, the top of the connector 100 is marked for reference.

In certain embodiments, each of the body portions 102 of the two coupled multi-fiber fiber optic connectors 100 are provided with top and bottom coupling interfaces 112 to assist in maintaining the direct coupling of the connectors 100 to one another; see dashed lines of FIG. 4. In certain embodiments, each of the top and bottom coupling interfaces 112 includes a guide pin 114 and a guide channel 116, also see FIG. 4.

Figure 10:
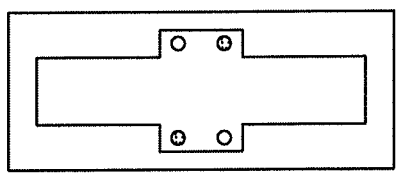
FIG. 10 provides a front and back view of an example embodiment of an adapter configured to couple two of the multi-fiber fiber optic connectors.
Figure 10:
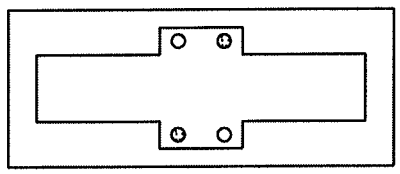
Figure 11:
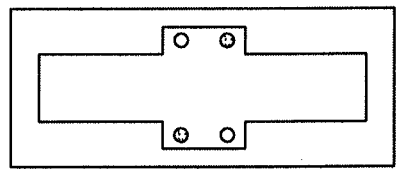
FIG. 11 provides a front and back view of another example embodiment of an adapter configured to couple two of the multi-fiber fiber optic connectors.
Figure 11:
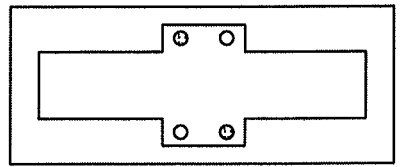

In the instance of using coupling interfaces 112, two versions of a mating adapter 120 can be used to assist in achieving the normal (top-up to top-up) coupling and the inverted (top-up to top-down) coupling. FIG. 10 illustrates the front 122a and back 124a of a mating adapter 120a configured for normal coupling. Each of the front 122a and the back 124a includes a guide pin 126a and a guide channel 128a, in the configuration shown, to receive a top-up connector (e.g., 100a/100b). FIG. 11 illustrates the front 122b and back 124b of a mating adapter 124b configured for inverted coupling of two connectors 100. Each of the front 122b and the back 124b includes a guide pin 126b and a guide channel 128b, in the configuration shown, with the front 122b of the mating adapter 120b configured to receive a top-up multi-fiber fiber optic connector, e.g. connector 100a, and the back 124b configured to receive a top-down (inverted) multi-fiber fiber optic connector, e.g., 100c.

The multi-fiber fiber optic connectors 100 can be used to connectorize one or both ends of a fiber optic patch cable 105.

Figure 12:
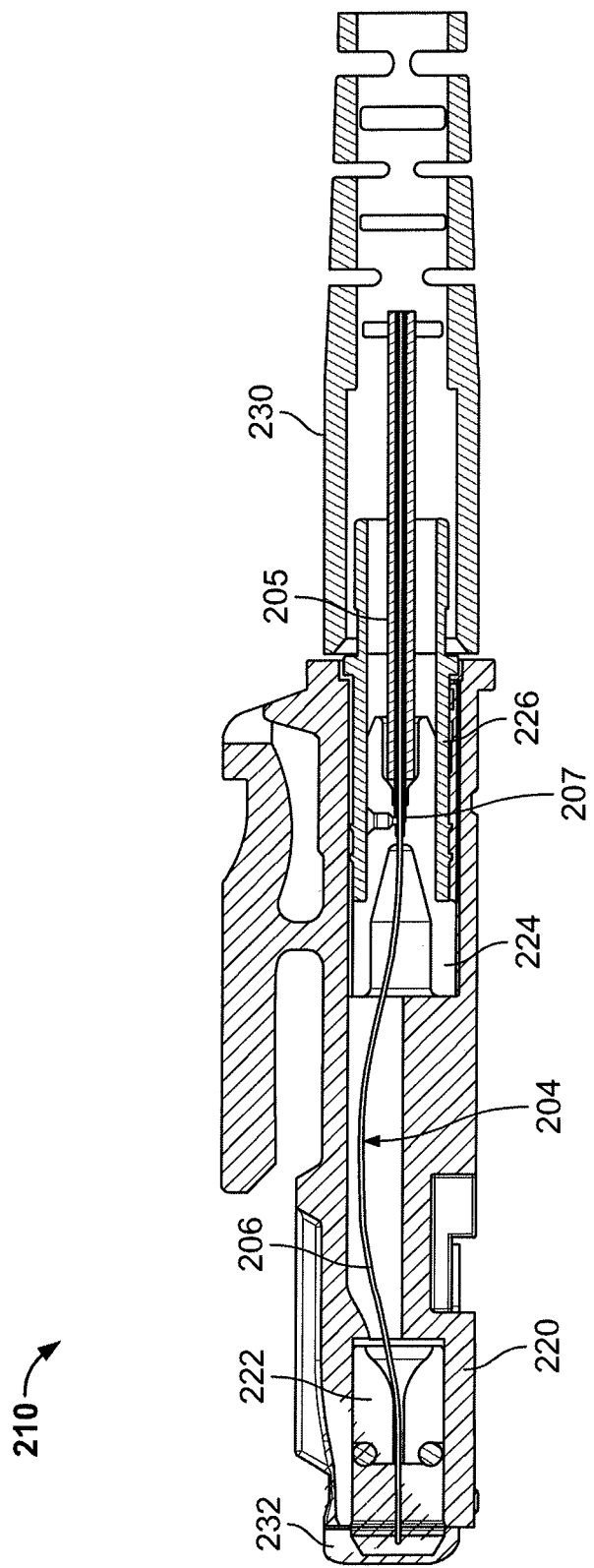
FIG. 12 provides a cross-sectional view of a ferrule-less connector that can be configured to replace the ferruled connector of the other FIGS.

The embodiments described above have utilized fiber optic connectors 100 that are intended to provide a body portion and/or housing that operates a ferrule for each of the plurality of optical fibers 104. However, it should be noted that ferrule-less fiber optic connectors can also be used in the various configurations described herein. An example of a ferrule-less connector 210 and an optical fiber 204 extending there through is illustrated in FIG. 12; the optical fiber 204 extends from a fiber optic cable 205. In certain examples, the optical fiber 204 includes a bare fiber section 206, e.g. a section of fiber comprising only a glass core and a glass cladding layer, and a coated section 207, e.g., a section of fiber comprising the core, the cladding, a coating layer and a buffer layer. The connector 210 comprises a main connector body 220, a fiber positioning piece 222, a fiber fixation component 224, and a proximal connector body 226. The ferrule-less connector 210 can additionally include various other components such as a boot 230 and a shutter 232. The ferrule-less connector, while illustrated with a single optical fiber, can also be configured to accommodate a plurality of optical fibers. Additional information regarding the ferrule-less connector 210 can be found in U.S. provisional patent application No. 62/352,281, filed Jun. 20, 2016 and entitled "Ferrule-less Fiber Optic Connector;" the entire contents of the identified application is hereby incorporated by reference. Additional information ferrule-less connectors can also be found in U.S. provisional patent application No. 62/388,696, filed Sep. 6, 2016 and entitled "Ferrule-Less Fiber Optic Connector Having Multiple Optical Fibers," as well as PCT Publication No. WO 2012/112344, PCT Publication No. WO 2013/117598 and U.S. Pat. No. 8,870,466. The entire content of each of the identified application is hereby incorporated by reference.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. A fiber optic connector comprising:
   a connector body housing a plurality of optical fibers, wherein each of the plurality of optical fibers includes a bare end having an angled face, and wherein a half of the plurality of optical fibers has an angled face that is at a first angle and the other half of the plurality of optical fibers has an angled face that is at a second angle, the second angle being complementary to the first angle, the connector body presenting a mating interface for mating with a second identically configured connector body regardless of the second identically configured connector body being in a top-up or a top-down orientation.

2. The fiber optic connector of claim 1, wherein the fiber optic connector comprises a ferrule-less fiber optic connector.

3. The fiber optic connector of claim 1, wherein the fiber optic connector comprises a ferruled-connector.

4. The fiber optic connector of claim 1, wherein the plurality of optical fibers are in a row and wherein a first half of the row including optical fibers having the first angle and wherein the second half of the row include optical fibers having the second angle.

5. The fiber optic connector of claim 1, wherein the plurality of optical fibers are in a row, and wherein the plurality of optical fibers in the row are presented in an alternating sequence between the optical fibers having the first angle and the optical fibers having the second angle.

6. The fiber optic connector of claim 5, wherein the alternating sequence comprises: a one-to-one optical fiber sequence, a two-to-two optical fiber sequence, a three-to-three optical fiber sequence, or a four-to-to-four optical fiber sequence.

7. The fiber optic connector of claim 1, wherein the plurality of optical fibers are in a plurality of rows.

8. A system comprising:
   a multi-fiber fiber optic cable including a plurality of optical fibers, wherein each of the plurality of optical fibers includes a bare end having an angled face, and wherein a first half of the plurality of optical fibers has an angled face that is at a first angle and a second half of the plurality of fibers has an angled face that is at a second angle that is complementary to the first angle; and
   a connector including a plurality of channels, wherein each one of the plurality of optical fibers is positioned within a corresponding one of the plurality of channels of the connector to place the angled face of the bare end of the optical fiber at a mating end of the channel.

9. The system of claim 8, wherein the plurality of channels are in a row within the connector and wherein the first half of the plurality of channels in the row position the first half of the plurality of optical fibers and wherein the second half of the plurality of channels in the row position the second half of the plurality of optical fibers.

10. The system of claim 8, wherein the plurality of channels are in a row within the connector, and wherein the plurality of channels in the row position their respective optical fibers in an alternating sequence between the optical fibers having the angled face at the first angle and the optical fibers having the angled face at the second angle.

11. The system of claim 10, wherein the alternating sequence comprises: a one-to-one optical fiber sequence, a two-to-two optical fiber sequence, a three-to-three optical fiber sequence, or a four-to-to-four optical fiber sequence.

12. The system of claim 8, wherein the plurality of channels are established within a plurality of rows in the connector.

13. The system of claim 8, wherein the plurality of optical fibers and the plurality of channels of the connector number greater than or equal to two.

14. The system of claim 8, wherein the plurality of optical fibers and the plurality of channels of the connector number: at least 12, at least 24, at least 36, at least 48, at least 60 or at least 72.

15. The system of claim 8, wherein the connector is in a top-up orientation and wherein the connector is configured to mate with a second identically configured connector that is in either a top-up orientation or a top-down orientation.

16. A system comprising:
   a multi-fiber fiber optic cable including a plurality optical fibers each including a first end and a second end, wherein each of the first and second ends comprises a bare end having an angled face, and wherein the angled face at the first end of a first half of the plurality of optical fibers has a first angle, the angled face at the first end of a second half of the plurality of optical fibers has a second angle, the angled face at the second end of the first half of the plurality of optical fibers has the second angle and the angled face at the second end of the second half of the plurality of optical fibers has the first angle, the first and second angles being complementary;
   a first connector and a second connector, each including a plurality of channels, wherein the first ends of the first half and the second half of the plurality of optical fibers are positioned within a corresponding one of the plurality of channels of the first connector to place the first ends of the plurality of optical fibers at a mating end of the channel of the first connector and wherein the second ends of the first half and second half of the plurality of optical fibers are positioned within a corresponding one of the plurality of channels of the second connector to place the second ends of the plurality of optical fibers at a mating end of the channel of the second connector.

17. The system of claim 16, wherein the plurality of channels are in a row within each of the first and second connectors.

18. The system of claim 16, wherein the plurality of channels are in a row within each of the first and second connectors, and wherein the plurality of channels in the row position their respective optical fibers in an alternating sequence between the optical fibers having the angled face at the first angle and the optical fibers having the angled face at the second angle.

19. The system of claim 18, wherein the alternating sequence comprises: a one-to-one optical fiber sequence, a two-to-two optical fiber sequence, a three-to-three optical fiber sequence, or a four-to-to-four optical fiber sequence.

20. The system of claim 16, wherein the plurality of channels are established within a plurality of rows in each of the first and second connectors.

21. The system of claim 16, wherein the plurality of optical fibers and the plurality of channels of each of the first and second connectors number greater than or equal to two.

22. The system of claim 16, wherein the plurality of optical fibers and the plurality of channels of each of the first and second connectors number: at least 12, at least 24, at least 36, at least 48, at least 60 or at least 72.

23. The system of claim 16, wherein each of the first and second connectors are configured to mate with an identically configured connector when the identically configured connector is in either a top-up or top-down orientation.

24. The system of claim 16, wherein each of the first and second connectors are configured to interface with an adapter having one of only two configurations.

* * * * *